G. W. BENT.
CASTER.
APPLICATION FILED NOV. 10, 1908.

940,780.

Patented Nov. 23, 1909.

Witnesses.
C. K. Garnett
J. Murphy.

Inventor:
George W. Bent
by Jas. H. Churchill
atty.

UNITED STATES PATENT OFFICE.

GEORGE W. BENT, OF HYDE PARK, MASSACHUSETTS.

CASTER.

940,780. Specification of Letters Patent. Patented Nov. 23, 1909.

Original application filed March 30, 1905, Serial No. 252,837. Divided and this application filed November 10, 1908. Serial No. 461,937.

*To all whom it may concern:*

Be it known that I, GEORGE W. BENT, a citizen of the United States, residing in Hyde Park, county of Norfolk, and State of Massachusetts, have invented an Improvement in Casters, of which the following description, in connection with the accompanying drawings, is a specification, like letters on the drawings representing like parts.

This invention relates to a furniture caster especially designed and adapted among other uses, to be employed on metallic beds having tubular posts or legs.

The invention has for its object to provide a simple and efficient caster for the purpose specified, and one in which the socket piece or bushing for the pintle of the caster, is held firmly in its place within the hollow post or leg and prevented from being forced up into the hollow post when the pintle is inserted into its socket and also prevented from being removed from said hollow post by the withdrawal of the pintle from its socket. To this end, the caster is provided with upwardly extended resilient gripping arms or members for frictionally bearing against the exterior of the hollow post and with means for supporting its pintle within the hollow post or leg. These and other features of this invention will be pointed out in the claims at the end of this specification.

Figure 1:
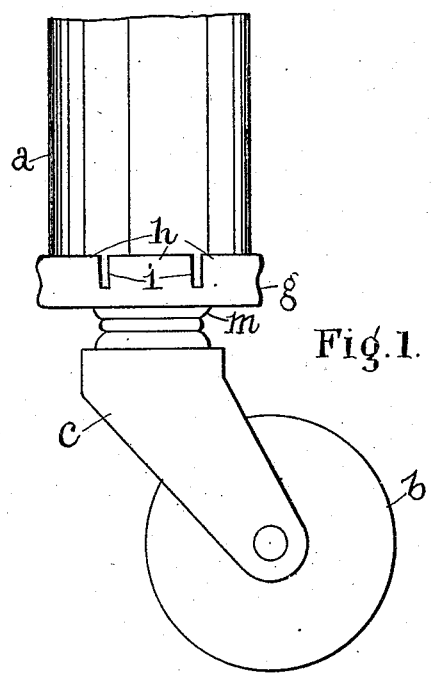
Figure 2:
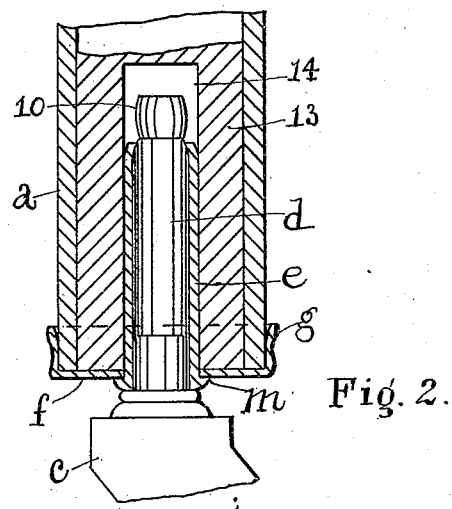
Figure 3:
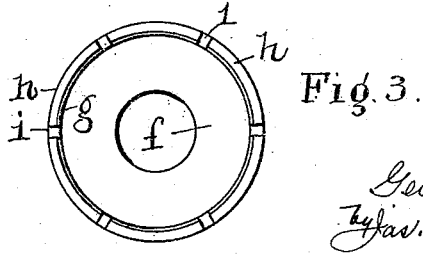

Figure 1 is an elevation of a sufficient portion of a hollow post or leg of a metallic bed provided with a caster embodying this invention, to enable the invention to be understood. Fig. 2, a partial section and elevation of the hollow post or leg and caster shown in Fig. 1, and Fig. 3, a plan view of the retaining cap shown in Figs. 1 and 2.

Referring to the drawings, *a* represents a hollow metal post, such as the hollow post or leg of a metallic bed. The hollow post or leg *a* is provided with a caster embodying this invention and comprising the caster wheel *b*, journaled in the frame *c* provided with the pintle *d*, which may be made cylindrical to fit into a socket piece or bushing *e* upon which is fitted a cap *f* provided with an upturned flange *g*, which is made non-continuous as herein represented to form spring arms or sections *h*, which are separated by spaces *i*. The cap *f* is retained on the socket piece *e* by an outwardly extended flange *m* at the lower end of said socket piece. To facilitate engagement of the cap with the outer circumference of the metal post *a*, and especially when said outer circumference is rough or irregular, the spring arms have their upper portions made flaring outwardly, while their lower portions are made of substantially the external diameter of the post or leg so as to frictionally engage the outer circumference of said post and retain the cap thereon.

By reference to Fig. 2, it will be seen that the cap *f* engaging the lower end of the hollow post or leg serves to prevent the socket piece being forced up into said post or leg and out of its proper position when the pintle is forced up into the socket piece, and that the spring arms or sections of the flange *g* serve to retain the cap on the hollow post or leg when the caster is removed.

Provision is made for centering the socket piece *e* within the hollow post or leg and for preventing undue lateral movement of the socket piece within the hollow post or leg. In the present instance, I have shown one construction for this purpose, which consists of a tubular block 13 of wood or other material, which fits substantially tight in the hollow post or leg and is provided with an opening 14 for the reception of the socket piece *e*, which in the present instance is contracted at its upper end to coöperate with a head 10 on the pintle to retain the pintle in said socket piece. The cap *f* may be fitted on the socket piece *e* sufficiently tight to prevent the latter being drawn out of the cap when the pintle is removed from the socket piece.

I have herein shown the flange *g* of the cap provided with spaces or slots *i* to form spring arms which grip the outer surface of the hollow post or leg *a* and frictionally secure the cap on said post or leg, but said flange may be made continuous as shown and described in another application, Serial Number 252,837 filed March 30, 1905, of which the present application is a division and wherein other forms of means for centering the socket piece within the hollow post or leg are also shown, and wherein the generic invention is claimed.

Claims.

1. A caster having upwardly extending resilient gripping arms or members, for frictionally bearing against the exterior of the leg and means for supporting its pintle within the leg.

2. A caster having upwardly extending resilient gripping arms or members for frictionally bearing against the exterior of a cylindrical leg and provided with inclined inner faces for coöperation with the leg.

3. A caster having upwardly extending resilient gripping arms or members for frictionally bearing against the exterior of the leg, combined with bearings for the pintle adapted to be received and contained within the interior of the leg.

4. A caster having upwardly extending resilient gripping arms or members, for frictionally bearing against the exterior of the leg, combined with bearings for supporting the caster pintle inside of the leg and in which the pintle is detachably secured.

5. A caster having a leg-supporting disk secured in respect to the pintle and having upturned resilient members frictionally embracing the exterior of the leg and securing the disk thereto and a frame or socket for receiving the pintle within the leg.

6. A caster having a pintle and a socket detachable therefrom and having upturned spring members engaging the exterior of the leg and centering and holding the socket thereby.

7. A caster having a pintle, a frame or socket adapted to be received within the tubular leg and in which the pintle is mounted, said caster being provided with a plurality of gripping arms or members extending upward on the outer surface of the leg to hold the caster to the leg.

8. The combination with a hollow post, of a cap covering the end of said post and provided with upturned sections separated from each other to form spring arms in frictional engagement with the outside of said post, a pintle extended through said cap into the hollow post, and a tubular bearing for said pintle extended through said cap, substantially as described.

In testimony whereof, I have signed my name to this specification in the presence of two subscribing witnesses.

GEORGE W. BENT.

Witnesses:
JAS. H. CHURCHILL,
J. MURPHY.